(12) United States Patent
Kim

(10) Patent No.: US 11,362,819 B2
(45) Date of Patent: Jun. 14, 2022

(54) IDENTIFICATION KEY GENERATING DEVICE AND IDENTIFICATION KEY GENERATING METHOD

(71) Applicant: Taewook Kim, Gyeonggi-do (KR)

(72) Inventor: Taewook Kim, Gyeonggi-do (KR)

(*) Notice: Subject to any disclaimer, the term of this patent is extended or adjusted under 35 U.S.C. 154(b) by 347 days.

(21) Appl. No.: 16/608,480

(22) PCT Filed: Apr. 18, 2018

(86) PCT No.: PCT/KR2018/004468
§ 371 (c)(1),
(2) Date: Oct. 25, 2019

(87) PCT Pub. No.: WO2018/199539
PCT Pub. Date: Nov. 1, 2018

(65) Prior Publication Data
US 2021/0119791 A1      Apr. 22, 2021

(30) Foreign Application Priority Data

Apr. 27, 2017   (KR) .......................... 10-2017-0054444

(51) Int. Cl.
*H04L 9/08*       (2006.01)
*H04L 9/32*       (2006.01)
*H01L 23/00*      (2006.01)

(52) U.S. Cl.
CPC .......... *H04L 9/0866* (2013.01); *H01L 23/573* (2013.01); *H04L 9/3278* (2013.01); *H04L 9/3236* (2013.01)

(58) Field of Classification Search
CPC ... H04L 9/0866; H04L 9/3278; H04L 9/3236; H01L 23/573
See application file for complete search history.

(56) References Cited

U.S. PATENT DOCUMENTS 8,877,525 B1* 11/2014 Leobandung ......... H01L 23/544
                                                    438/14
9,292,710 B2*  3/2016 Kim ..................... H04L 9/0861
(Continued)

FOREIGN PATENT DOCUMENTS

KR       101118826 B1     4/2012
KR       101139630 B1     5/2012
(Continued)

OTHER PUBLICATIONS

M. Avram, A. Avram, F. Comanescu, A. M. Popescu, C. Voitincu; Reactive Ion Etching for Patterning High Aspect Ratio and Nanoscale Features; 2009; IEEE; International Semiconductor Conference, pp. 1-4 (Year: 2009).*

(Continued)

*Primary Examiner* — Yin Chen Shaw
*Assistant Examiner* — Alex D Carrasquillo
(74) *Attorney, Agent, or Firm* — Ohlandt, Greeley, Ruggiero & Perle, L.L.P.

(57) ABSTRACT

The present invention provides an identification key generating device and an identification key generating method. The identification key generating device comprises: a plurality of unit cells provided on a circuit in a semiconductor manufacturing procedure; a reading unit for reading for shorting of each of the unit cells; a digital value generation unit for determining the probability for the shorting of each of the unit cells, and generating a digital value of each of the unit cells on the basis of the reading for shorting from the reading unit; and a selection unit for selecting at least one of the plurality of unit cells, wherein an identification key is generated from a combination of respective digital values generated from the unit cells selected by means of the selection unit.

10 Claims, 10 Drawing Sheets

(56) References Cited

U.S. PATENT DOCUMENTS

| | | | |
|---|---|---|---|
| 9,397,826 B2* | 7/2016 | Kim | G06F 21/72 |
| 2007/0167011 A1* | 7/2007 | Hidaka | H01L 21/3065 |
| | | | 438/689 |
| 2011/0087697 A1* | 4/2011 | Kashiwagi | G06F 16/2228 |
| | | | 707/769 |
| 2013/0101114 A1 | 4/2013 | Kim et al. | |
| 2013/0105439 A1* | 5/2013 | Zhu | G02B 5/1809 |
| | | | 216/24 |
| 2013/0322624 A1 | 12/2013 | Kim et al. | |
| 2015/0137380 A1* | 5/2015 | in 't Zandt | H01L 23/564 |
| | | | 257/773 |
| 2016/0013135 A1* | 1/2016 | He | H01L 23/481 |
| | | | 438/653 |
| 2016/0132296 A1* | 5/2016 | Park | H03K 3/84 |
| | | | 708/255 |
| 2016/0233177 A1 | 8/2016 | Choi et al. | |
| 2016/0247769 A1* | 8/2016 | Choi | H04L 9/3278 |

FOREIGN PATENT DOCUMENTS

| | | | |
|---|---|---|---|
| KR | 101442401 B1 | 9/2014 |
| KR | 101457305 B1 | 11/2014 |
| KR | 101504025 B1 | 11/2014 |
| KR | 101663341 B1 | 10/2016 |

OTHER PUBLICATIONS

International Search Report dated Jul. 30, 2018 for PCT application No. PCT/KR2018/004468.

* cited by examiner

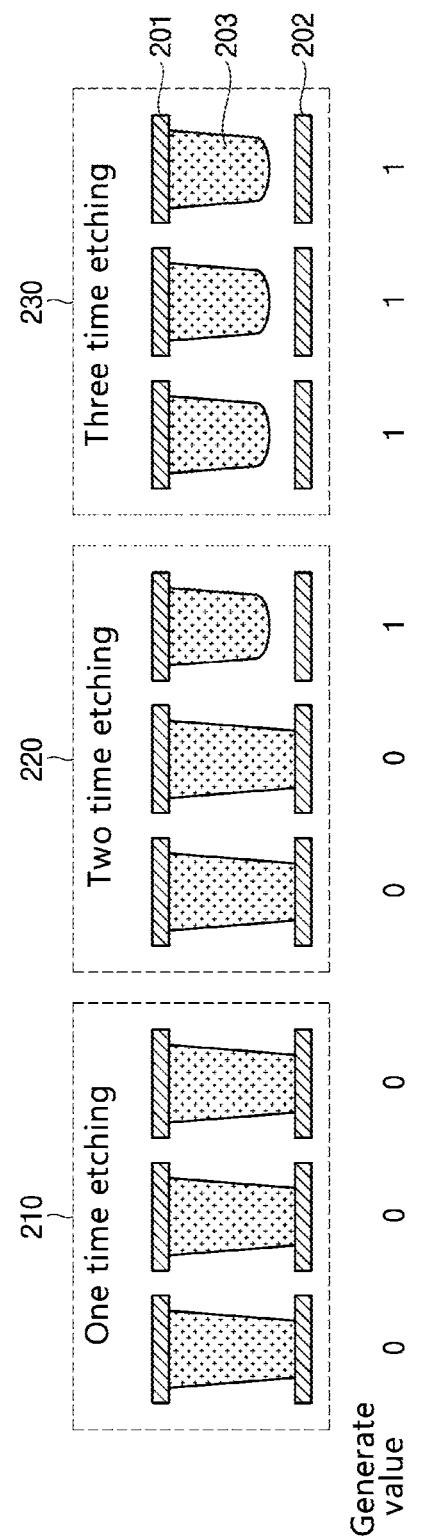

IDENTIFICATION KEY GENERATING DEVICE AND IDENTIFICATION KEY GENERATING METHOD

BACKGROUND OF THE DISCLOSURE

1. Field of the Disclosure

The present disclosure relates to digital security field, and more particularly, to a method for encryption and decryption necessary for security of electronic devices, embedded system security, System on Chip (SoC) security, smart card security and Universal Subscriber Identity Module (USIM) security, and a device and method for generating an identification key used in digital signature.

2. Background of Related Art

With the development of information society, the need for personal privacy protection increases, and technology to build security systems for securely transmitting information by encryption and decryption is considered essential and very important.

In the advanced information society, together with high performance computers, the use of embedded system or System on Chip (SoC) type computing devices is rapidly increasing. The computing devices have a wide range of applications, for example, Radio-Frequency Identification (RFID), smart card, Universal Subscriber Identity Module (USIM) and One Time Password (OTP).

To build security systems in the computing devices, a cryptographic-key used in the encryption and decryption algorithm or a unique ID is used, and the cryptographic-key or the unique ID is hereinafter referred to as an identification key. For the identification key, a method is primarily used in which a cryptographically secure Pseudo Random Number (PRN) is externally generated and stored in a non-volatile memory such as flash memory or Electrically Erasable Programmable Read-Only Memory (EEPROM).

Recently, various attacks such as side channel attacks and reverse engineering attacks are committed against the identification key stored in the computing device. To securely generate and store the identification key from these attacks, Physical Unclonable Function (PUF) technology is developed.

PUF generates an identification key using a very small difference in physical properties that exists in electronic systems, and maintains or stores the identification key while keeping it intact, and it is also known as hardware fingerprint.

To use PUF for the identification key, first, the generated identification key should have sufficient randomness, and second, its value does not change and should preserve invariance with respect to the flow of time or changes in usage environment.

However, the conventional technologies have difficulty in ensuring sufficient randomness, and fail to solve the problem with the generated identification key changing with changes in physical properties over time or changes in usage environment.

Additionally, earlier Via size PUF patents have changes in probability of output bits (a phenomenon in which the mean value is biased) resulting from spatial and temporal process variations (differences in process characteristics depending on the location on wafer or the process date/time), and its consequential value availability problem and yield problem (faults when the mean value of output values is biased more than a predetermined level).

Accordingly, it is necessary to solve changes in probability of output bits resulting from spatial and temporal process variations, and its consequential value availability problem and yield problem of earlier Via size PUF patents.

SUMMARY

The present disclosure is designed to solve the above-described problem, and an object of the present disclosure is to provide an identification key generating device and method that generates a true random value using a semiconductor manufacturing process, and develops Physical Unclonable Function (PUF) technology featuring that the value never changes after it is generated for the purpose of use as an identification key.

In addition, another object of the present disclosure is to provide an identification key generating device and method that probabilistically ensures balancing between a digital value of 0 and a digital value of 1 in an identification key having the form of a digital value.

Further, still another object of the present disclosure is to provide an identification key generating device and method for implementing PUF that cannot be physically cloned and is impervious to external attacks with a low manufacturing cost by a simple manufacturing process.

Meanwhile, yet still another object of the present disclosure is to design PUF in the mask design stage as well as to control randomness of PUF values (randomness of 0, 1, probability (=mean)) at the process level.

To solve the above-described problem, an identification key generating device of the present disclosure includes a plurality of unit cells provided on a circuit in a semiconductor manufacturing procedure, a reading unit for reading for shorting of each of the unit cells, a digital value generation unit for determining the probability for the shorting of each of the unit cells, and generating a digital value of each of the unit cells on the basis of the reading for shorting from the reading unit, and a selection unit for selecting at least one of the plurality of unit cells, wherein an identification key is generated from a combination of respective digital values generated from the unit cells selected by means of the selection unit.

Each of the plurality of unit cells may include a pair of conductive layers of a semiconductor, and a contact or via disposed between the pair of conductive layers to short or open the conductive layers.

The reading unit may read whether a short occurs in each unit cell by reading whether the contact or via shorts the conductive layers.

Etching characteristics of the contact or via may be set such that the short is probabilistically determined in the semiconductor manufacturing procedure.

The etching characteristics may include at least one of an etching type, an etching rate and an etching time.

The etching rate may be 3.0 to 3.5 µm/s, and the etching time may be 5 s to 7 s.

The digital value generation unit may set etching characteristics of the contact or via such that a difference between a probability that the contact or via shorts the conductive layers and a probability that the contact or via fails to short the conductive layers is within a predetermined error range.

The digital value generation unit may have N unit configurations, each generating a 1 bit digital value using a pair of conductive layers and one contact or via connecting the conductive layers, and generate an N bit identification key through the N unit configurations, wherein N is a natural number.

The identification key generating device may further include a digital value processing unit to receive N bit digital values read by the reading unit as input and process the N bit digital values, wherein the digital value processing unit compares a first bit and a second bit among the input N bit digital values, and when a value of the first bit is larger than a value of the second bit, determines a digital value representing the first bit and the second bit to be 1, and when the value of the first bit is smaller than the value of the second bit, determines the digital value representing the first bit and the second bit to be 0.

The digital value processing unit may determine the digital value representing the first bit and the second bit to be any one of 1 and 0, or fail to determine the digital value representing the first bit and the second bit, when the value of the first bit is equal to the value of the second bit.

An identification key generating method includes reading whether a short occurs in each of a plurality of unit cells provided on a circuit in a semiconductor manufacturing procedure, adjusting a vertical spacing between conductive layers and etching characteristics of patterning in the semiconductor manufacturing procedure, generating a digital value from each unit cell by probabilistic determination of whether a short occurs in the unit cells that constitute the circuit, selecting at least one of the plurality of unit cells, and generating an identification key from a combination of digital values of the selected unit cells.

Each of the plurality of unit cells may include a pair of conductive layers of a semiconductor, and a contact or via disposed between the pair of conductive layers to short or open the conductive layers, and the reading may include reading whether the contact or via shorts the conductive layers.

The contact or via may be formed by etching characteristics such that a short between the two conductive layers is probabilistically determined.

The etching characteristics may include at least one of an etching type, an etching rate and an etching time.

The etching rate may be 3.0 to 3.5 µm/s, and the etching time may be 5 s to 7 s.

The generating the digital value may include setting etching characteristics of the contact or via such that a difference between a probability that the contact or via shorts the conductive layers and a probability that the contact or via fails to short the conductive layers is within a predetermined error range.

The generating the digital value may include generating an N bit identification key through N unit configurations, each of the N unit configurations generating a 1 bit digital value using a pair of conductive layers and one contact or via connecting the conductive layers, wherein N is a natural number.

The generating the digital value may include processing the digital value to receive N bit digital values read by the reading unit as input and process the N bit digital values, and the processing the digital value may include comparing a first bit and a second bit among the received N bit digital values, and when a value of the first bit is larger than a value of the second bit, determining a digital value representing the first bit and the second bit to be 1, and when the value of the first bit is smaller than the value of the second bit, determining the digital value representing the first bit and the second bit to be 0.

The processing the digital value may include determining the digital value representing the first bit and the second bit to be any one of 1 and 0, or failing to determine the digital value representing the first bit and the second bit, when the value of the first bit is equal to the value of the second bit.

In the semiconductor manufacturing process, a digital value is generated based on whether a short occurs in unit cells, some of the generated digital values are selected to generate an identification key, and the value does not change after it is generated, and thus reliability is high.

In addition, it is possible to ensure randomness by probabilistically guaranteeing balancing between a digital value of 0 and a digital value of 1 in the identification key having the form of a digital value by the digital value processing unit.

Further, as the identification key is generated in the semiconductor manufacturing process, the cost for identification key generation is low, the manufacturing process is simple, and the identification key cannot be physically cloned and is impervious to external security attacks.

Meanwhile, it is possible to solve changes in probability of output bits resulting from spatial and temporal process variations, and its consequential value availability problem and yield problem, by controlling randomness (randomness of 0, 1, probability (=mean)) of the Physical Unclonable Function (PUF) value at the process level.

BRIEF DESCRIPTION OF THE FIGURES

FIG. 2A is a conceptual diagram showing shorted and open unit cells of the present disclosure, and their generated digital values.

FIG. 2C is a conceptual diagram showing connection or disconnection of metal lines of the present disclosure.

DETAILED DESCRIPTION

Hereinafter, the disclosed embodiments will be described in detail with reference to the accompanying drawings, and identical or similar elements are given identical or similar reference signs and redundant descriptions are omitted herein. As used herein, the suffix "unit" is only given or used to ease the drafting of the specification, and does not have any meaning or role for identifying itself. Additionally, in describing the embodiments disclosed herein, when a certain detailed description of relevant known technology is determined to render the key subject matter of the disclosed embodiments ambiguous, the detailed description is omitted herein. Additionally, the accompanying drawings are provided for an easy understanding of the disclosed embodiments, and the technical spirit disclosed herein is not limited by the accompanying drawings, and it should be understood that the present disclosure covers all modifications, equivalents or alternatives falling in the spirit and technical scope of the present disclosure.

The terms "first", "second", and the like may be used to describe various elements, but the elements are not limited by the terms. These terms are used to distinguish one element from another.

It will be further understood that when an element is referred to as being "connected to" another element, it can be directly connected or linked to the other element or intervening elements may be present.

As used herein, the singular forms are intended to include the plural forms as well, unless the context clearly indicates otherwise.

It will be understood that the term "comprises" or "includes" when used in this specification, specifies the presence of stated features, integers, steps, operations, elements, components or groups thereof, but does not preclude the presence or addition of one or more other features, integers, steps, operations, elements, components, or groups thereof.

Figure 1:
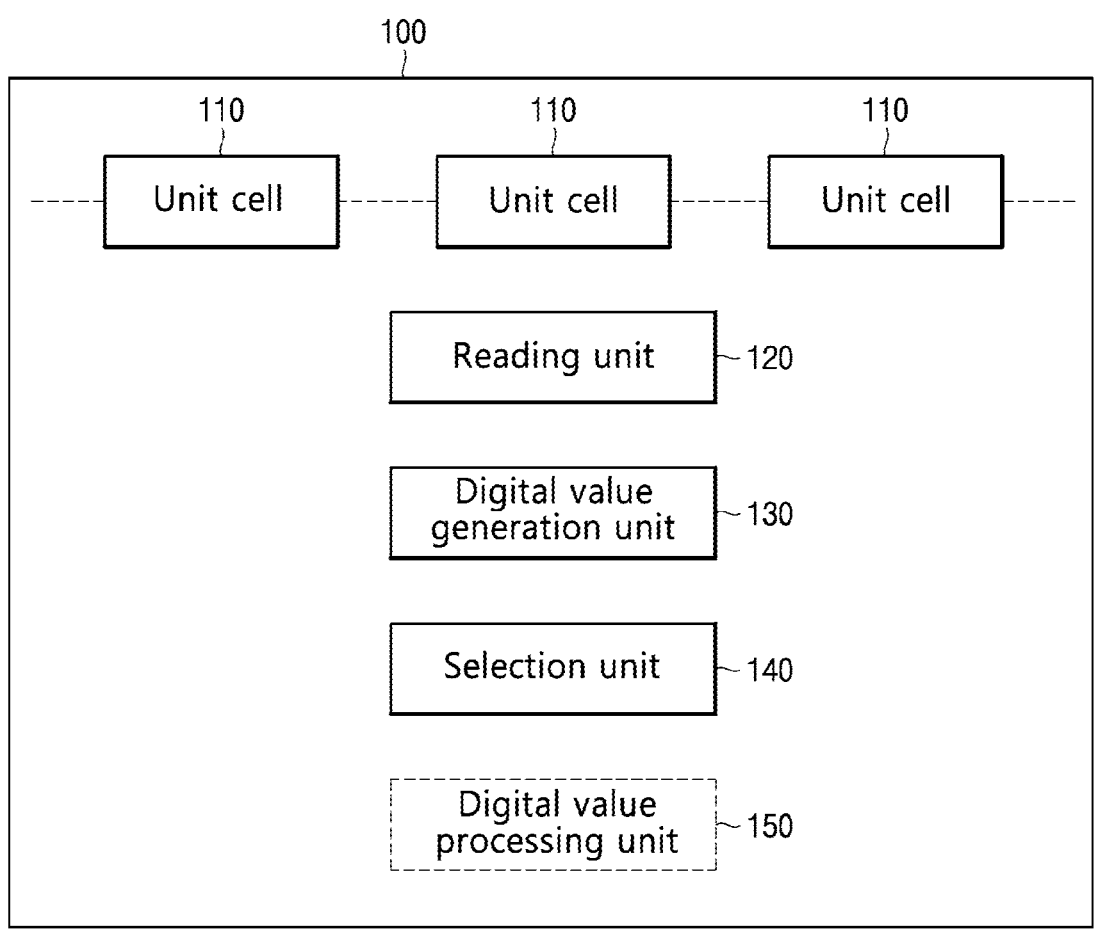
FIG. 1 is a block diagram showing an identification key generating device according to an embodiment of the present disclosure.

FIG. 1 shows an identification key generating device 100 according to an embodiment of the present disclosure.

The identification key generating device 100 includes a plurality of unit cells 110, a reading unit 120, a digital value generation unit 130 and a selection unit 140.

The plurality of unit cells 110 is provided on a circuit in a semiconductor manufacturing process. For example, each of the plurality of unit cells 110 may include a pair of conductive layers (201, 202 in FIG. 2A) of a semiconductor and a contact or via (203 in FIG. 2A) disposed between the conductive layers 201, 202. The contact or via 203 shorts or opens the conductive layers 201, 202 to generate a digital value as described below, and in this way, an identification key is generated from a combination of digital values.

The contact or via 203 is designed to connect the conductive layers 201, 202, and generally, the size of the contact or via 203 is determined to short the conductive layers 201, 202. Additionally, in the general semiconductor process, the contact or via 203 is formed by etching at a sufficient etching rate and time to short the conductive layers 201, 202. In the present disclosure, the etching rate may be etched depth per unit time.

However, in the implementation of the digital value generation unit 130 according to an embodiment of the present disclosure, etching for forming the contact or via 203 are set to be performed at a low rate for a short time such that some contacts or vias 203 short the conductive layers 201, 202 and some other contacts or vias 203 fail to short the conductive layers 201, 202, and whether a short occurs is probabilistically determined. To this end, the type or concentration of etching material may vary. In the present disclosure, the etching rate may be 40-60% of the etching rate used in the semiconductor fabrication, and the etching time may be 40-60% of the etching time used in the semiconductor fabrication.

For example, in the following experimental example, the etching rate may be 3.0 to 3.5 μm/s or 2.5 to 3.1 μm/s. Additionally, the etching time may be 6 s or 11 s.

In the present disclosure, probabilistically determining may refer to randomly determining. Additionally, in the present disclosure, probabilistically determining may include determining with 50% probability or 45-55% probability.

In the conventional semiconductor process, if the contact or via 203 does not short the conductive layers 201, 202, it is a failure of the process, while the present disclosure intentionally causes a short and uses it to generate an identification key having randomness.

The settings of the etching characteristics for forming the contact or via 203 according to the above-described embodiment will be described below in more detail with reference to FIGS. 2A to 3.

Additionally, according to another embodiment of the present disclosure, the via 203 used for connection of the two conductive layers 201, 202 is different from the contact or via 203 used for identification key generation, and each may be provided according to separate design rules.

Meanwhile, according to still another embodiment of the present disclosure, the identification key generating device 100 generates an identification key having randomness by probabilistic determination of whether a short occurs between the conductive lines by adjusting the spacing between wirings and the etching characteristics in the semiconductor manufacturing process.

This embodiment also generates a random identification key, away from the process of guaranteeing an open between the conductive lines in the conventional semiconductor manufacturing process. The conductive metal line according to the above-described embodiment will be described below in more detail with reference to FIG. 4.

Additionally, according to another embodiment of the present disclosure, the spacing between the conductive layers 201, 202 used for insulation between the two conductive layers 201, 202 is different from the spacing between the conductive layers 201, 202 used for identification key generation, and each may be provided according to separate design rules.

The digital value generation unit 130 electrically generates the identification key generated by the above-described embodiments. A read transistor may be used to identify whether the contact or via 203 shorts the conductive layers 201, 202, or whether the conductive lines are shorted, and this configuration will be described below in more detail with reference to FIG. 6.

Meanwhile, in the embodiment using the process for forming the contact or via 203, even if a ratio of a probability that the contact or via 203 shorts the conductive layers 201, 202 and a probability that the via 203 fails to short the conductive layers 201, 202 is adjusted to ½ as equally as possible by adjusting the process characteristics for forming the contact or via 203, but it may not be guaranteed that a ratio of the probability of short (that is to say, a digital value of 0) and the probability of open (that is to say, a digital value 1) is probabilistically perfectly equal. Although an example describes that in the shorted state, the digital value may be represented as 0, and in the open state, the digital value may be represented as 1, the present disclosure is not necessarily limited thereto, and in the shorted state, the digital value may be represented as 1, and in the open state, the digital value may be represented as 0.

That is, as etching for forming the contact or via 203 is performed at a higher rate for a longer time, there is a higher probability that a short will occur between the two conductive layers 201, 202, and on the contrary, as etching is performed at a lower rate for a shorter time, there is a higher probability that a short will not occur (an open will occur) between the two conductive layers 201, 202, and when any one of the probability of short and the probability of open is higher, randomness of the generated identification key reduces.

This problem is the same with the embodiment of adjusting the spacing between the conductive lines or the etching characteristics with regard to the spacing between the conductive lines.

The reading unit 120 reads whether a short occurs in each unit cell 110.

In the present disclosure, reading may be detecting or sensing whether a short occurs in each unit cell. The reading unit may be a detection unit or a sensing unit. When the reading unit is a detection unit or a sensing unit, the detection unit or the sensing unit may be one of many types of sensors.

The reading unit 120 may be connected to the unit cell 110. For example, the reading unit 120 may read whether the via 203 shorts or opens the conductive layers 201, 202. Additionally, the reading unit 120 may store an identification key generated from a digital value or a combination of digital values generated by the digital value generation unit 130 described below.

For example, the reading unit 120 may be a logic gate, an amplifier, a register or a flip-flop. However, the reading unit 120 is not limited to the register or the flip-flop, and may be understood as a broad concept that can read whether a short or open occurs between the conductive layers 201, 202, and store the digital value and the identification key.

The digital value generation unit 130 may probabilistically determine whether a short occurs in each unit cell, and based on whether a short occurs read by the reading unit 120, generate a digital value for each unit cell 110.

The selection unit 140 is configured to select at least one of the plurality of unit cells 110. An identification key is generated from a combination of digital values generated for each unit cell 110 selected by the selection unit 140.

Accordingly, according to an embodiment of the present disclosure, the identification key generating device 100 further includes a digital value processing unit 150 to process the digital value with randomness by receiving and processing information associated with whether a short occurs read by the reading unit 120. For reference, the term 'processing' of the digital value or 'digital value processing unit' is used in the specification, but this should not be interpreted as being limited to processing the generated digital value through a separate technique or algorithm, and should be understood as referring to a series of configurations that performs balancing between 0 and 1 to ensure randomness in the generation of an identification key from the generated digital value.

The digital value processing unit 150 will be described below in more detail with reference to FIG. 7.

FIG. 2A is a conceptual diagram showing the shorted and open unit cells 110 of the present disclosure, and their generated digital values.

Shown are vias 203 formed between conductive layer 1 202 and conductive layer 2 201 in the semiconductor manufacturing process.

In a first etching group 210 having a sufficiently high etching rate and long etching time when forming the via 203, all the vias 203 short the conductive layer 1 202 and the conductive layer 2 201, and when whether a short occurs is represented by a digital value, the digital value is 0 in all cases.

Meanwhile, in a third etching group 230 having too low etching rate and too short etching time when forming the via 203, all the vias 203 fail to short the conductive layer 1 202 and the conductive layer 2 201. Accordingly, when whether a short occurs is represented by a digital value, the digital value is 1 in all cases.

Additionally, in a second etching group 220 having the etching rate and time between those of the group 210 and the group 230 when forming the via 203, some vias 203 short the conductive layer 1 202 and the conductive layer 2 201, and some other vias 203 fail to short the conductive layer 1 202 and the conductive layer 2 201.

The identification key generating device 100 according to an embodiment of the present disclosure is configured to set the etching characteristics when forming the via 203, such that some vias 203 short the conductive layer 1 202 and the conductive layer 2 201 and some other vias 203 fail to short the conductive layer 1 202 and the conductive layer 2 201 as in the second etching group 220.

Figure 2B:
FIG. 2B is a conceptual diagram showing a metal line of the present disclosure.

Referring to FIGS. 2B and 2C, the metal or poly line etching method requires etching of such a rate and time that a probability of connection of A and B is 50%. FIG. 2C shows an example of metal or poly line etching by which A and B are connected or disconnected with a random probability.

When forming the contact or via 203, the probability of short between the two conductive layers 201, 202 is proportional to the etching rate and time. It is ideal that a probability distribution of whether a short occurs has 50% probability of short, and the identification key generating device 100 according to an embodiment of the present disclosure is configured to set the etching process characteristics such that the probability distribution is close to 50% to the maximum extent. The etching process characteristics may be determined by experiments, and may be adjusted during the process.

Figure 3:
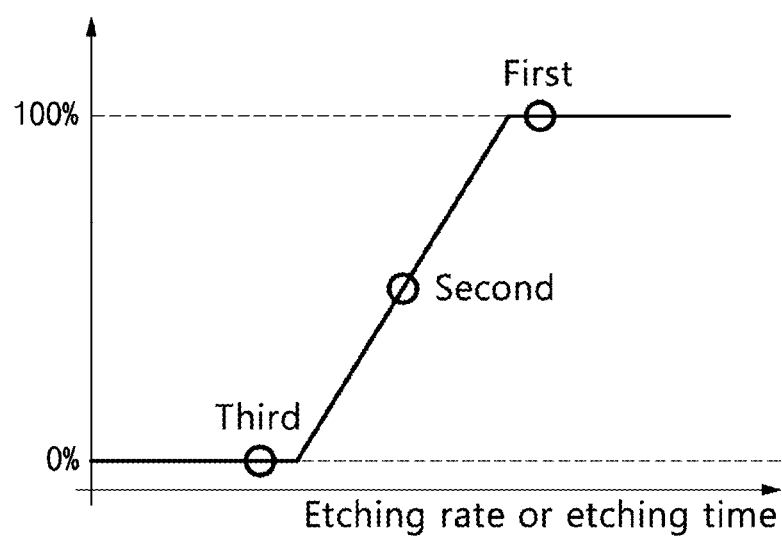
FIG. 3 is a graph showing a probability of short of unit cells as a function of etching rate or time.

FIG. 3 is a graph showing the probability of short of the unit cells 110 as a function of etching rate or time.

It can be seen from the graph that as the etching rate is higher and the etching time is longer, the probability of short of the contact or via 203 is closer to 100%.

Additionally, the embedded system (EM) is characterized by the etching process in which the probability of short between the two conductive layers 201, 202 is theoretically 50%, and as described above, the value is different depending on the process and it is possible to find the most similar value by experiments, but difficult to find an accurate embedded system.

Accordingly, the digital value generation unit 130 according to an embodiment of the present disclosure may set whether a short occurs between the conductive layers 201, 202 to be within the range between Ex1 and Ex2 having a predetermined allowable error from 50% probability (although Ex1 and Ex2 are not separately shown, an area having a predetermined margin near Ex shown) according to a specific experiment.

Figure 4:
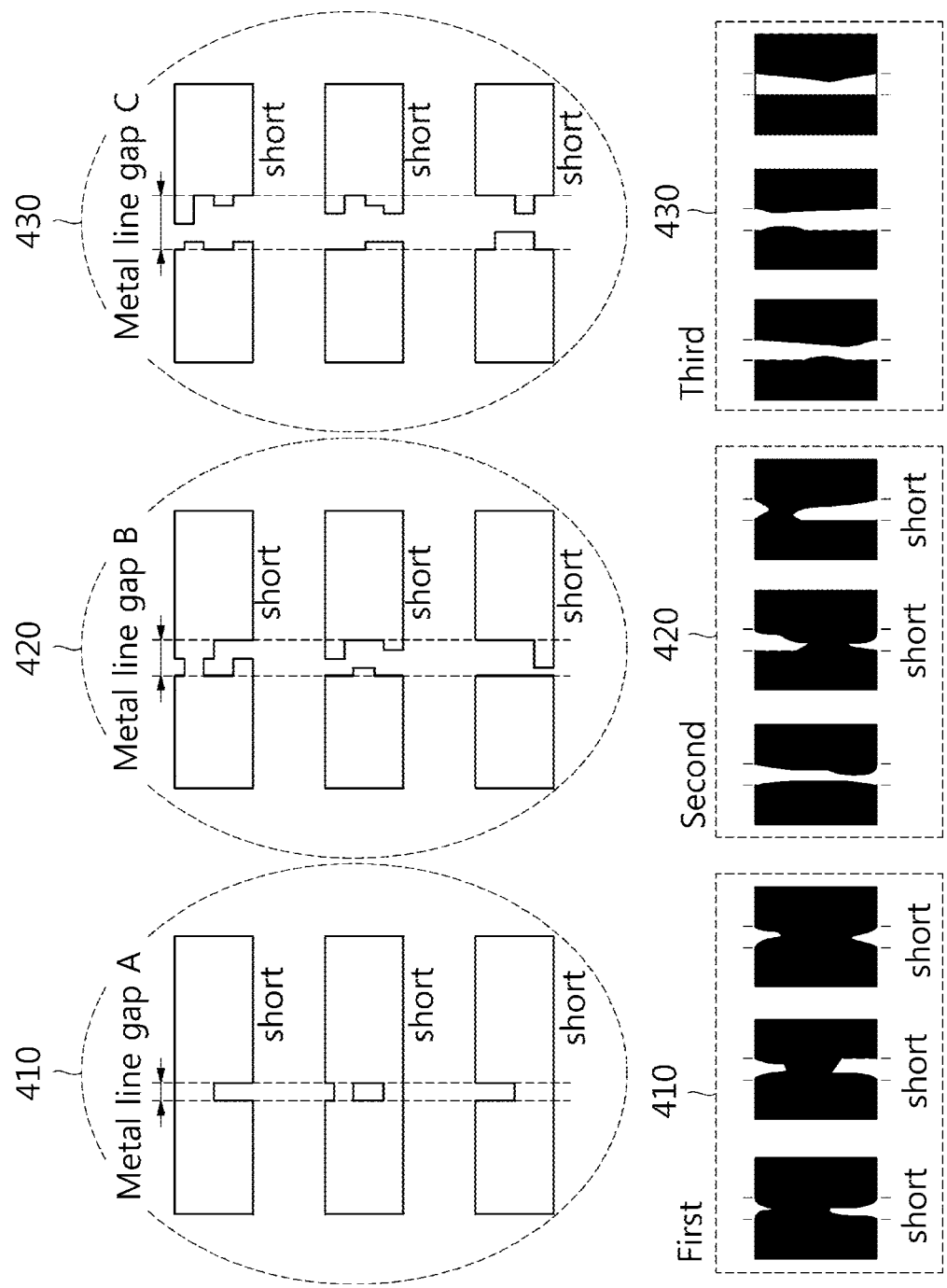
FIG. 4 is a conceptual diagram showing whether a short occurs as a function of spacing between metal lines.

FIG. 4 is a conceptual diagram showing whether a short occurs as a function of spacing between the metal lines.

As described above, according to another embodiment of the present disclosure, whether a short occurs between the metal lines may be probabilistically determined by adjusting the spacing between the metal lines and the etching characteristics (rate and time). In a first group 410 having a large spacing between the metal lines, a short occurs between the metal lines in all cases.

Additionally, in a third group 430 having a small spacing between the metal lines, a short does not occur between the metal lines in any case.

The digital value generation unit 130 according to an embodiment of the present disclosure sets the spacing between the metal lines such that a short probabilistically occurs between the metal lines, as in a group 420, a short occurs between some metal lines and a short does not occur between some metal lines.

Additionally, although not shown in the drawings, by reducing the etching rate or the etching time in the metal lines, whether a short occurs may be probabilistically determined.

In the first group having a high etching rate or a long etching time of the metal lines, a short occurs between the metal lines in all cases.

Additionally, in the third group 430 having a small spacing between the metal lines and a low etching rate and a long etching time, a short does not occur between the conductive lines in any case.

The digital value generation unit 130 according to an embodiment of the present disclosure sets the etching rate and time of the metal lines such that a short probabilistically occurs between the metal lines, as in the second group 420, a short occurs between some metal lines and a short does not occur between some metal lines.

In FIG. 4, the edges of the metal lines are uneven, and it may be understood as a result of the limitation on the patterning accuracy by etching and randomness.

Figure 5:
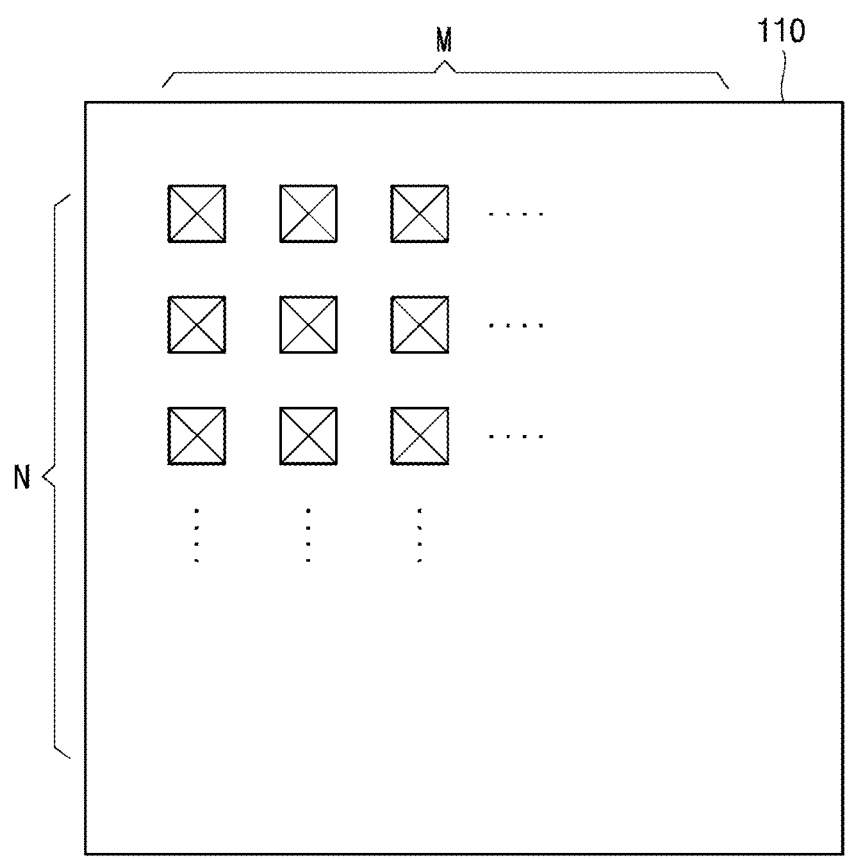
FIG. 5 is a conceptual diagram showing arrangement of unit cells in an identification key generating device.

FIG. 5 is a conceptual diagram showing arrangement of the unit cells 110 in the identification key generating device 100.

Shown are M*N unit cells 110 total (M unit cells wide by N unit cells high, where M and N are a natural number) arranged on a semiconductor substrate.

The digital value generation unit 130 generates M*N bit digital values according to whether each of the M*N vias 203 shorts the conductive layers 201, 202 (a digital value of 0) or not (a digital value of 1).

Additionally, with the generated M*N bit digital values, the unit cell 110 is selected by the selection unit 140, and an identification key is generated from a combination of digital values generated for each unit cell 110 selected by the selection unit 140.

Figure 6:
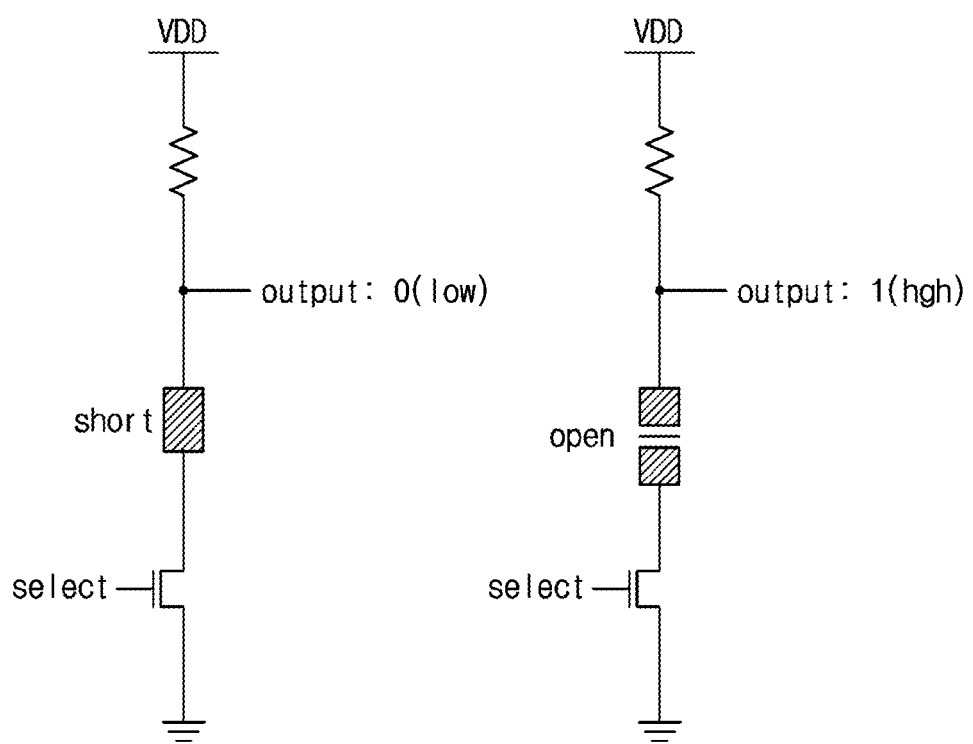
FIG. 6 is a detailed circuit configuration of a digital value generation unit according to an embodiment of the present disclosure.

FIG. 6 is a detailed circuit configuration of the digital value generation unit 130 according to an embodiment of the present disclosure.

According to an embodiment of the present disclosure, the digital value generation unit 130 tests whether a short occurs using the read transistor between the power voltage VDD and the ground.

In the example of FIG. 6 of configuration as a pull-down circuit (although not specifically mentioned in the specification, it is obvious that the description of the pull-down circuit may expand to an example of configuration as a pull-up circuit, and its description is omitted herein), when the individual vias 203 in the digital value generation unit 130 short the conductive layers 201, 202, the output value is 0, and otherwise, the output value is 1. On the contrary, when the individual vias 203 in the digital value generation unit 130 short the conductive layers 201, 202, the output value may be 1, and otherwise, the output value may be 0. Through this process, the digital value generation unit 130 generates a digital value, and an identification key is generated by selection of the selection unit 140.

Of course, in an embodiment using a short between the conductive lines, an identification key is generated in the same way.

However, the configuration of the digital value generation unit 130 of FIG. 6 according to an embodiment of the present disclosure is only one embodiment, and the present disclosure is not interpreted as being limited by some embodiments.

Accordingly, modifications may be made without departing from the spirit of the present disclosure if the configuration can test whether a short occurs between the conductive layers 201, 202 or the metal lines in the digital value generation unit 130 and generate a digital value, and this configuration falls within the scope of the present disclosure.

Meanwhile, the identification key generated by the digital value generation unit 130 is transmitted to and stored in an identification key storage unit (not shown), and the identification key storage unit may be a register or a flip-flop (not shown) that receives the generated identification key as input and stores it.

Although not specifically mentioned below, in addition to the register or the flip-flop that reads and stores the generated identification key, any other equivalent may be understood as the identification key storage unit.

Figure 7:
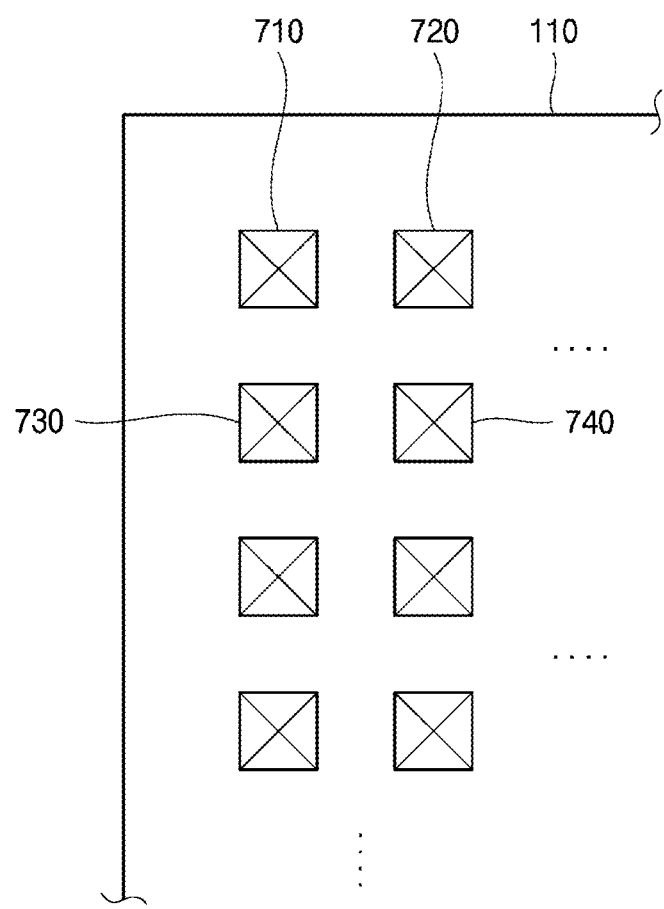
FIG. 7 is a conceptual diagram showing a process of processing a digital value by a digital value processing unit according to an embodiment of the present disclosure.

FIG. 7 is a conceptual diagram showing a process of processing a digital value by the digital value processing unit according to an embodiment of the present disclosure.

According to an embodiment of the present disclosure, the digital value processing unit 150 selects two of the M*N bit digital values generated by the digital value generation unit 130 and compares them.

Although in a conceptual sense, selection of two bits from the digital values generated by the digital value generation unit 130 is described herein with reference to FIG. 7, this is just an exemplary embodiment, and the identification key reading unit 120 including a register or a flip-flop may select two bits from the bits stored in the register or the flip-flop, which can be applied by those having ordinary skill in the art without any particular difficulty, so it should be interpreted as falling in the scope of the present disclosure.

In the example of FIG. 7, two bits are selected from the bits generated by the digital value generation unit 130.

Additionally, the digital value processing unit compares each digital value generated from a first bit 710 and a second bit 720. Additionally, when the digital value of the first bit 710 is larger than the digital value of the second bit 720, a digital value representing the first bit 710 and the second bit 720 is determined to be 1.

On the contrary, when the digital value of the first bit 710 is smaller than the digital value of the second bit 720, a digital value representing the first bit 710 and the second bit 720 is determined to be 0.

Of course, when the digital value of the first bit 720 is larger than the digital value of the second bit 710, the representative digital value may be determined to be 1.

When the digital value of the first bit 710 is equal to the digital value of the second bit 720, the representative digital value may be determined to be 1 or 0, or may not be determined.

In this way, a representative digital value is generated by comparing a third bit 730 and a fourth bit 740, a digital value is selected by the selection unit 140, and finally, an identification key is determined by a combination of digital values.

This process may be understood as an identification key processing process with high randomness of an identification key.

Because a ratio at which a short occurs (a digital value of 0) and a ratio at which a short does not occur (a digital value of 1) are different from each other in the digital value generation unit 130, balancing between 0 and 1 may not be achieved, and in such a case, a probability that 1 and 0 will be generated for each bit (even though the probability is not 50%) because the two bits are equal to each other, a probability that any one of the two bits will have a larger digital value than the other is 50%. Accordingly, it will be understood that probabilistic balancing between 0 and 1 is achieved through the above-described process.

Meanwhile, if the originally generated identification key is M*N bits, in FIG. 7, the identification key finally determined by the digital value processing unit 150 is (M*N/2) bits. This is due to determining a new 1 bit digital value using 2 bit digital value.

Additionally, the grouping or identification key processing process of the digital value processing unit 150 described above is only an embodiment of the present disclosure, and the identification key processing process for maintaining the balancing between a digital value of 0 and a digital value of 1 may be modified without departing from the spirit of the present disclosure.

The new identification key generated by the digital value generation unit 130 and determined by the digital value processing unit 150 as described above is a value that has randomness, theoretically does not change permanently once it is generated, and thus is reliable.

Therefore, according to the embodiments of the present disclosure, it is possible to generate a reliable identification key using a random number having the property that its value is invariant over time, in a simple manner at a low manufacturing cost.

Additionally, the random identification key is generated in the semiconductor manufacturing process, and the identification key is invariant over time after it is generated, and thus there is no need for a process of externally inputting the identification key into a separate non-volatile memory like the conventional method. Accordingly, there is no need to transfer the identification key to/from an external device, and even if the semiconductor chip layout design is leaked, the identification key generated by a difference in the physical properties in the manufacturing process cannot be copied, and thus security is very good. Additionally, a non-volatile memory manufacturing process is unnecessary, resulting in manufacturing cost savings.

Figure 8:
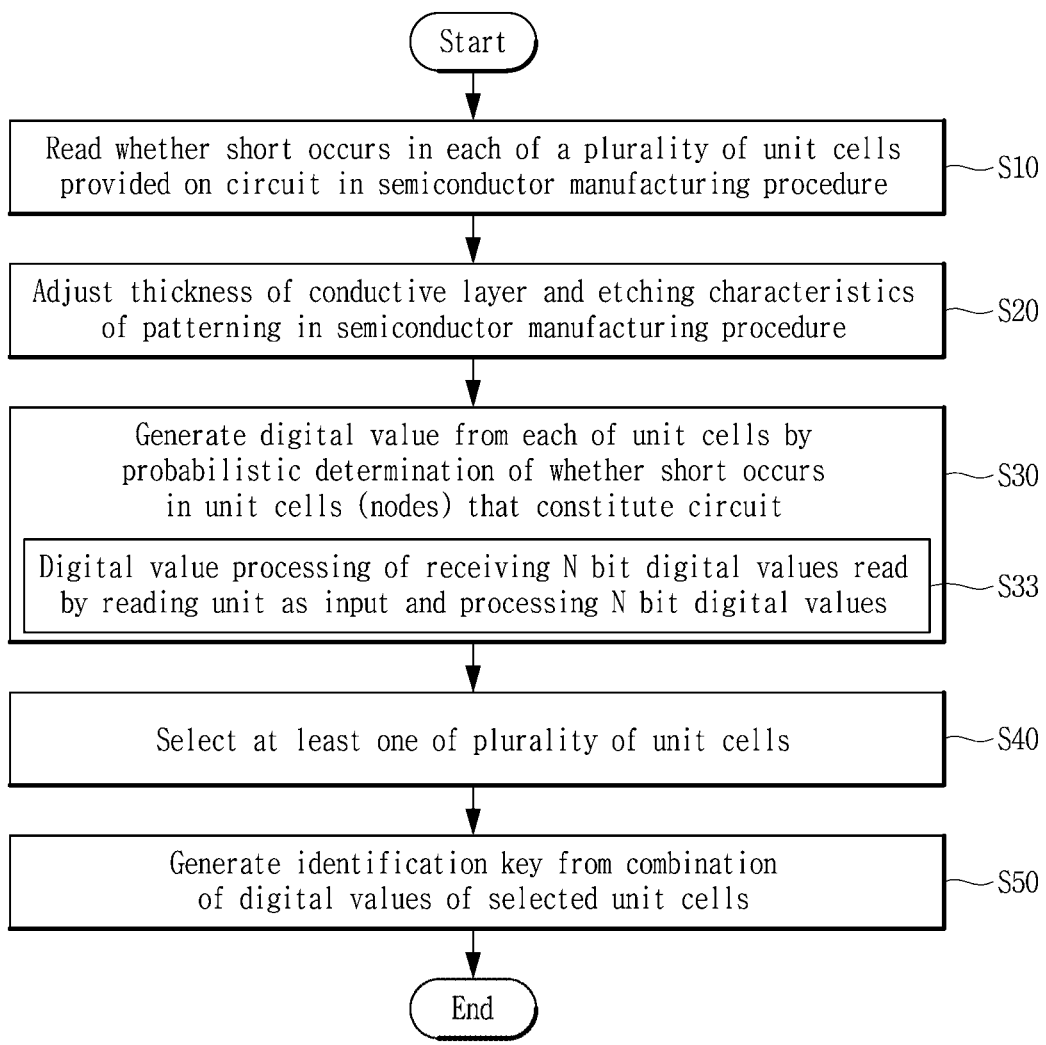
FIG. 8 is a flowchart showing an identification key generating method according to an embodiment of the present disclosure.

FIG. 8 is a flowchart showing an identification key generating method according to an embodiment of the present disclosure.

Hereinafter, the identification key generating method will be described, and the method of the present disclosure will be primarily described below, and regarding the device characteristics, a reference is made to the description of the identification key generating device.

The identification key generating method includes: reading whether a short occurs in each of the plurality of unit cells 110 provided on a circuit in the semiconductor manufacturing process (S10), adjusting the vertical spacing between the conductive layers 201, 202 and the etching characteristics of patterning in the semiconductor manufacturing process (S20); generating a digital value from each of the unit cells 110 (e.g., nodes) that constitute the circuit by probabilistic determination of whether a short occurs in the unit cells 110 (S30); selecting at least one of the plurality of unit cells 110 (S40); and generating an identification key from a combination of digital values of the selected unit cell 110 (S50).

According to an embodiment of the present disclosure, the reading unit 120 reads whether a short occurs in each of the plurality of unit cells 110 (S10). For example, the reading unit 120 reads whether a short occurs between the pair of conductive layers 201, 202 of the semiconductor, and as described above, the reading unit 120 reads whether the contact or via 203 shorts the conductive layers 201, 202.

By the step of adjusting the vertical spacing between the conductive layers 201, 202 and the etching characteristics of patterning (S20), a probability that the contact or via 203 shorts or opens the conductive layers 201 is adjusted.

Here, by adjustment of the etching characteristics, the surface roughness of the conductive layers 201, 202 is adjusted and the bonding rate between the conductive layers 201, 202 and the contact or via 203 is adjusted.

In the step of generating a digital value from each unit cell 110 by probabilistic determination of whether a short occurs in the unit cells 110 that constitutes the circuit (S30), a digital value of 0 or 1 is generated according to whether a short occurs between the conductive layers 201, 202. Whether a short occurs in the unit cell 110 nodes may be probabilistically determined.

The digital value generation step S30 may include a digital value processing step (S33), and in the digital value processing step (S33), N bit digital values read by the reading unit 120 are received as input and processed.

For example, in the digital value processing step (S33), among the input N bit digital values, a first bit and a second bit are compared, and when the value of the first bit is larger than the value of the second bit, a digital value representing the first bit and the second bit is determined to be 1, and when the value of the first bit is smaller than the value of the second bit, a digital value representing the first bit and the second bit is determined to be 0.

Additionally, in the digital value processing step (S33), when the value of the first bit is equal to the value of the second bit, a digital value representing the first bit and the second bit is determined to be any one of 1 and 0, or is not determined, selectively based on settings.

At least one of the plurality of unit cells 110 is selected the selection unit 140 (S40), and an identification key is generated from a combination of the selected digital values (S50).

According to an embodiment of the present disclosure, by adjustment of the vertical spacing between the conductive layers 201, 202 and the etching characteristics of patterning, whether a short occurs in the nodes generated in the semiconductor manufacturing process is random, and the short characteristics between the nodes do not physically change, and thus the identification key does not change once it is generated.

According to an embodiment of the present disclosure, the digital value generation unit 130 generates a digital value according to whether the contact or via formed between the conductive layers (metal layers) 201, 202 generated in the semiconductor manufacturing process shorts the conductive layers 201, 202, and generates an identification key from a combination of digital values by the selection unit 140, and the settings of the etching characteristics in the process of forming the contact or via 203 according to the above-described embodiment are as described above with reference to FIGS. 2A to 4.

Additionally, according to another embodiment of the present disclosure, the via 203 used for connection of the two conductive layers 201, 202 is different from the contact or via 203 used for identification key generation, and each may be provided according to separate design rules.

Meanwhile, according to another embodiment of the present disclosure, the digital value generation unit 130 generates the identification key having randomness by adjusting the spacing between the conductive layers 201, 202 and the etching characteristics in the conductive line pattern formation process of the semiconductor manufacturing process, such that a short occurs between some conductive lines and a short does not occur between some conductive lines. This embodiment is as described above with reference to FIGS. 4 to 6.

Additionally, according to another embodiment of the present disclosure, the spacing between the two conductive layers 201, 202 used for insulation between the conductive layers 201, 202 is different from the spacing between the conductive layers 201, 202 used for identification key generation, and each may be provided according to separate design rules.

The identification key storage unit stores and keeps the digital key or the identification key generated according to the above-described embodiments through the register or the flip-flop. In the process of generating and reading the identification key, the read transistor may be used to identify whether the contact or via 203 shorts the conductive layers 201, 202, or whether the conductive lines are shorted.

Additionally, the digital value processing unit 150 processes the digital value generated by the digital value generation unit 130, to ensure randomness.

Finally, the generated identification key is provided to a user through an output unit.

In the experimental example related to the identification key generation device and the identification key generating method related to the present disclosure, for example, the etching pressure may be 26 mTorr, gas used in etching may be SF6, the flow rate may be 130 SCCM, the source may be 600 W, and the bias may be 20 W. Particularly, the etching time may be 5 s to 7 s and the etching rate may be 3.0 to 3.5 µm/s.

Additionally, in another example, the etching pressure may be 20 mTorr, gas used in etching may be SF6, the flow rate may be 130 SCCM, the source may be 600 W, and the bias may be 15 W. Particularly, the etching time may be 10 s to 12 s and the etching rate may be 2.5 to 3.1 µm/s.

As a result of carrying out the experiment 10,000 times by the etching characteristics, a short occurs in the unit cells with 45-55% probability.

The identification key generating device 100 and the identification key generating method described hereinabove are not limited to the configuration and method of the embodiments described above, and some or all the embodiments may be selectively combined to make various modification.

It is obvious to those skilled in the art that the present disclosure may be embodied in other particular forms without departing from the spirit and essential features of the present disclosure. Therefore, the above detailed description should not be interpreted as being limiting in all aspects and should be considered as being exemplary. The scope of the present disclosure should be determined by the reasonable interpretation of the appended claims, and the scope of the present disclosure covers all modifications within the equivalent scope of the present disclosure.

The invention claimed is:

1. An identification key generating device, comprising:
   a plurality of unit cells provided on a circuit in a semiconductor manufacturing procedure;
   a reading unit configured to read shorting of each of the unit cells;
   a digital value generation unit configured to determine a probability for the shorting of each of the unit cells, and generate a digital value of each of the unit cells on the basis of the reading shorting from the reading unit; and
   a selection unit configured to select at least one of the plurality of unit cells,
   wherein an identification key is generated from a combination of respective digital values generated from the unit cells selected by the selection unit,
   wherein each of the plurality of unit cells includes a pair of conductive layers of a semiconductor and a contact or via disposed between the pair of conductive layers to short or open the conductive layers,
   wherein the read unit is configured to read whether a short occurs in each unit cell by reading whether the contact or via shorts the conductive layers,
   wherein the contact or via is formed by etching characteristics such that the short is probabilistically determined in the semiconductor manufacturing procedure, and
   wherein each of the units comprises at least one logic or circuit
   wherein the etching characteristics include an etching type, an etching rate and an etching time, and
   wherein the etching rate is 3.0 to 3.5 µm/s, and the etching time is 5 s to 7 s.

2. The identification key generating device according to claim 1, wherein the digital value generation unit is configured to set etching characteristics of the contact or via such that a difference between a probability that the contact or via shorts the conductive layers and a probability that the contact or via fails to short the conductive layers is within a predetermined error range.

3. The identification key generating device according to claim 1, wherein the digital value generation unit is configured to have N unit configurations, each generating a 1 bit digital value using a pair of conductive layers and one contact or via connecting the conductive layers, and generates an N bit identification key through the N unit configurations, wherein N is a natural number.

4. The identification key generating device according to claim 3, further comprising:
   a digital value processing unit configured to receive N bit digital values read by the reading unit as input and process the N bit digital values,
   wherein the digital value processing unit is configured to compare a first bit and a second bit among the input N bit digital values, and when a value of the first bit is larger than a value of the second bit, determines a digital value representing the first bit and the second bit to be 1, and
   when the value of the first bit is smaller than the value of the second bit, determines the digital value representing the first bit and the second bit to be 0.

5. The identification key generating device according to claim 4, wherein the digital value processing unit is configured to determine the digital value representing the first bit and the second bit to be any one of 1 and 0, or fails to determine the digital value representing the first bit and the second bit, when the value of the first bit is equal to the value of the second bit.

6. An identification key generating method, comprising:
   reading whether a short occurs in each of a plurality of unit cells provided on a circuit in a semiconductor manufacturing procedure;
   adjusting a vertical spacing between conductive layers and etching characteristics of patterning in the semiconductor manufacturing procedure;
   generating a digital value from each unit cell by probabilistic determination of whether a short occurs in the unit cells that constitute the circuit;

selecting at least one of the plurality of unit cells; and generating an identification key from a combination of digital values of the selected unit cells, wherein each of the plurality of unit cells includes a pair of conductive layers of a semiconductor and a contact or via disposed between the pair of conductive layers to short or open the conductive layers, wherein the reading comprises reading whether a short occurs in each unit cell by reading whether the contact or via shorts the conductive layers, wherein the contact or via is formed by etching characteristics such that a short is probabilistically determined in the semiconductor manufacturing procedure, wherein the etching characteristics include an etching type, an etching rate and an etching time, and wherein the etching rate is 3.0 to 3.5 µm/s, and the etching time is 5 s to 7 s.

7. The identification key generating method according to claim 6, wherein the generating the digital value comprises setting etching characteristics of the contact or via such that a difference between a probability that the contact or via shorts the conductive layers and a probability that the contact or via fails to short the conductive layers is within a predetermined error range.

8. The identification key generating method according to claim 6, wherein the generating the digital value comprises generating an N bit identification key through N unit configurations, each of the N unit configurations generating a 1 bit digital value using a pair of conductive layers and one contact or via connecting the conductive layers, wherein N is a natural number.

9. The identification key generating method according to claim 8, wherein the generating the digital value comprises processing the digital value to receive N bit digital values read by reading as input and process the N bit digital values, and the processing the digital value comprises comparing a first bit and a second bit among the received N bit digital values, and when a value of the first bit is larger than a value of the second bit, determining a digital value representing the first bit and the second bit to be 1, and when the value of the first bit is smaller than the value of the second bit, determining the digital value representing the first bit and the second bit to be 0.

10. The identification key generating method according to claim 9, wherein the processing the digital value comprises determining the digital value representing the first bit and the second bit to be any one of 1 and 0, or failing to determine the digital value representing the first bit and the second bit, when the value of the first bit is equal to the value of the second bit.

* * * * *